United States Patent
Testman, Jr.

[11] Patent Number: 5,899,217
[45] Date of Patent: May 4, 1999

[54] ENGINE WASH RECOVERY SYSTEM

[76] Inventor: Frank L. Testman, Jr., 374 Pleasant Ave., Hamburg, N.Y. 14075

[21] Appl. No.: 09/021,784

[22] Filed: Feb. 10, 1998

[51] Int. Cl.$^6$ ......................................................... B08B 9/08
[52] U.S. Cl. .................................... 134/104.4; 134/104.2; 134/201; 134/169 A; 134/123
[58] Field of Search ............................ 134/104.4, 104.2, 134/137, 201, 169 A, 123, 45

[56] References Cited

U.S. PATENT DOCUMENTS

| | | | |
|---|---|---|---|
| 1,337,408 | 4/1920 | Morris | 134/45 |
| 1,938,254 | 12/1933 | Hinson | 141/1 |
| 2,385,393 | 9/1945 | Wilson | 184/1.5 |
| 2,804,903 | 9/1957 | Davies | 150/52 |
| 3,646,980 | 3/1972 | Peterson | 150/52 R |
| 4,022,257 | 5/1977 | O'Connell . | |
| 4,064,969 | 12/1977 | Black | 184/1.5 |
| 4,378,755 | 4/1983 | Magnusson | 118/684 |
| 4,512,463 | 4/1985 | Ward . | |
| 4,598,883 | 7/1986 | Suter | 244/1 R |
| 4,606,363 | 8/1986 | Scales | 134/111 |
| 4,705,248 | 11/1987 | McIntyre . | |
| 4,765,352 | 8/1988 | Strieter | 134/99 |
| 4,911,191 | 3/1990 | Bain | 134/200 |
| 5,015,301 | 5/1991 | Baylor | 134/22.1 |
| 5,016,314 | 5/1991 | Green | 15/320 |
| 5,114,098 | 5/1992 | Campbell . | |
| 5,143,321 | 9/1992 | Jackson . | |
| 5,558,112 | 9/1996 | Strieter | 134/103.2 |

FOREIGN PATENT DOCUMENTS

110533   5/1944   Sweden .
574986   1/1946   United Kingdom .

Primary Examiner—Frankie L. Stinson
Assistant Examiner—Mialeeka C. Williams-Bibbs
Attorney, Agent, or Firm—Richard C. Litman

[57] ABSTRACT

An engine wash recovery system is temporarily installed on an aircraft turbine engine to recover wash liquids and contaminants washed from the engine during engine cleaning operations. The apparatus basically comprises a collector, an engine exhaust duct, and a container. The collector is formed of a flexible, liquid proof material which is removably secured beneath the engine housing (fuselage, nacelle, cowling, etc.) of the aircraft, to capture wash liquids which spill from the housing. The duct is removably connected to the engine exhaust, to capture spray which has passed through the engine as the engine is turned over at a relatively low rpm to flush the fluid through the engine. Both the collector and the duct are connected to a container for recovering all liquids emanating from the engine and its housing during the wash process. The collector may include a forward extension to capture liquids which back up out of the engine intake or inlet, and a rearward extension which extends back to the exhaust. The container may include baffling therein to reduce turbulence and mixing of recovered liquids with air from the engine exhaust, and a filter to preclude dispersion of liquids and contaminants into the atmosphere as air is exhausted from the container. The container is relatively small and light weight, and is easily moved manually by a single individual, without need for powered equipment. The collector and duct are also both relatively light in weight, and may be folded or collapsed for compact storage.

20 Claims, 3 Drawing Sheets

ENGINE WASH RECOVERY SYSTEM

BACKGROUND OF THE INVENTION

1. Field of the Invention

The present invention relates generally to article cleaning means, particularly using water or other liquids or solvents, and more specifically to a system for recovering wash water or solvent used in cleaning an aircraft turbine engine on the aircraft. The system comprises a flexible, liquid proof container which is secured about the underside of the cowling or structure containing the engine, and a second container resting on the surface, for containing waste liquids transferred from the flexible container. The device eliminates, or greatly reduces, spillage of liquids during the engine cleaning operation, and provides for the containment of any hazardous waste released during the operation.

2. Description of the Related Art

All internal combustion engines will build up a certain amount of solid carbon and other deposits internally, at least to a certain extent, over some operational period of time. Depending upon the type of engine, it can become increasingly important to clean such deposits from the engine after some period of operation, generally from a few to several hundred hours of operation.

This internal engine cleaning procedure is conducted routinely by the military with their turbine engine powered aircraft. Generally, the procedure involves the introduction of a liquid solvent or detergent solution into the intake or compressor portion of the engine, whereupon the engine is turned over at a relatively low speed (compared to normal operational rpm; the speed may be on the order of 20% of normal operational rpm) to cause the compressor to force the fluid through the engine and to wash carbon buildup and deposits from the engine, particularly downstream of the hot section of the engine and through the exhaust turbine section.

This procedure is quite efficient at removing carbon and other buildups from the internal components of the engine. However, it will be seen that the detergents or solvents used, will be expelled from the exhaust of the engine, directly onto the underlying surface (ramp pavement, hangar floor, etc.) unless some arrangement is made to recapture the liquid. Also, fluid will spill from the inlet of the cowling or fuselage when the fluid is introduced into the intake portion of the cowling or engine, and will generally spill between the engine and cowling, to leak from various openings and seams in the bottom of the cowling. Obviously, the conventional procedure is exceedingly messy, and results in a great deal of liquid, with contaminants from the engine, being spilled and sprayed over a relatively wide area. This is all the more critical, considering the various hazardous wastes (hydrocarbons, cadmium from plated components, etc.) which must be cleaned up after each engine cleaning operation.

In accordance with the above, a need will be seen for an engine wash recovery system which captures liquids expelled from the engine, engine cowling, and/or fuselage of a turbine engine aircraft undergoing an engine cleaning operation. The system must provide for the capture of any liquids spilling externally from the cowling or fuselage containing the engine, and must also capture liquids which have passed through the engine as they exit the engine from the engine exhaust. The system must be relatively light weight and easy to install, remove, and store as needed, while also providing positive capture of hazardous wastes during the engine cleaning operation, for proper disposal afterwards.

A discussion of the related art of which the present inventor is aware, and its differences and distinctions from the present invention, is provided below.

U.S. Pat. No. 2,804,903 issued on Sep. 3, 1957 to George A. Davies, titled "Protective Cover For A Jet Engine," describes a flexible, bag-like enclosure which completely encloses a turbine engine for sealing during storage. The device cannot be hung from beneath a nacelle or fuselage structure by straps for ease of installation and removal, as provided by the present invention. Even if the device were modified for installation by removing the upper portion and adding straps, there is still no suggestion of any means of recapturing substantial amounts of liquids which pass through the engine, and passing them to another catch container, as provided by the present invention. The Davies enclosure would overflow in short order, resulting in spillage.

U.S. Pat. No. 3,646,980 issued on Mar. 7, 1972 to Fred D. Peterson, titled "Jet Engine Cowl Cover," describes a removable intake cover for turbojet engine aircraft. The device is quite limited relative to the present invention, in that it only covers and seals the intake of the engine. No container for removable installation beneath the fuselage or nacelle is disclosed by Peterson, and no means of ducting or transferring liquid spilled after passing through the engine and/or nacelle or fuselage, is disclosed by Peterson, which features are provided by the present invention.

U.S. Pat. No. 4,022,257 issued on May 10, 1977 to Daniel J. O'Connell, titled "Funnel-Drainer Device," describes a rigid catch container in the form of an inverted conical section, with a flexible container bag extending from one side of its lower end. The result is generally opposite that of the present invention, which generally comprises a flexible catch container which straps suspendably beneath an engine nacelle or cowling, and which is connected to a rigid receptacle. The rigid catch container or the O'Connell device thus cannot be flexibly draped beneath an engine, as provided by the present invention, and moreover, O'Connell does not provide any means of capturing any fluids which exit the exhaust of the engine, as provided by the present invention. The O'Connell device is primarily directed to use in capturing oil drained from the drain pan of an automobile engine, and cannot be converted or modified in any way to perform the function of the present invention.

U.S. Pat. No. 4,064,969 issued on Dec. 27, 1977 to Charles A. Black, titled "Oil Drain Bag," describes an oil collection container for collecting oil drained from an automobile engine. No means is provided by Black for suspending the device from beneath the engine housing (nacelle, cowling, fuselage, etc.) of an aircraft, nor is any means provided by Black for collecting spray passing internally through the engine and exiting the exhaust, both of which means are provided by the present invention.

U.S. Pat. No. 4,512,463 issued on Apr. 23, 1985 to Randall W. Ward, titled "Free-Standing Flexible Container For Fluids," describes a container for capturing fluids drained from an automobile or other vehicle engine or mechanical component. The device comprises a rigid lower portion, with a flexible upper portion adapted for forming a closure about the top of the device when it has been filled with a fluid. The device is not structured to fit closely about the lower portion of an aircraft engine nacelle or the like, nor is it structured to pass spray carried by engine exhaust through a duct to a container therefor, as provided by the present invention.

U.S. Pat. No. 4,598,883 issued on Jul. 8, 1986 to William L. Suter, titled "Apparatus For Protecting A Portion Of The Exterior Of An Aircraft," describes a plurality of foam sheets which are removably secured to the upper portions of an aircraft to protect it from the elements. No means of capturing fluids passing through and around the engine and/or cowling is disclosed, as the apparatus does not enclose any of the lower portion of the aircraft.

U.S. Pat. No. 4,705,248 issued on Nov. 10, 1987 to Jonothon M. W. McIntyre, titled "Fluid Collection And Drain Apparatus," describes a disposable collection container for collecting oil or other fluids drained from an automobile. No means is disclosed for suspending the device from beneath the engine, or for collecting and passing exhaust gas and spray passing through the engine to a container for capturing the liquid portions thereof, as provided by the present invention.

U.S. Pat. No. 5,114,098 issued on May 19, 1992 to Teddy G. Campbell, titled "Aircraft Engine Protective Cover," describes a flexible shield for removably securing to the exhaust nozzle of a turbojet aircraft engine. The device is completely closed, in order to preclude entry of fuel vapors into the hot section of the engine during aircraft refueling operations, and thus cannot transfer exhaust spray to another container, as provided by the present invention. Campbell does not provide any means of capturing fluid runoff from beneath the engine nacelle, as provided by the present invention.

U.S. Pat. No. 5,143,321 issued on Sep. 1, 1992 to Thomas H. Jackson, titled "Folding Protective Cover For Turbo-Engines," describes a turbojet inlet cover for precluding the entry of dirt and foreign objects into the engine inlet while the engine is shut down and the aircraft parked. The device does not extend beneath the nacelle and cannot capture fluids passing through or around the engine and exiting the engine exhaust and nacelle, as provided by the present invention.

Swedish Patent Publication No. 110,533 published on May 2, 1944 illustrates a flexible cover for an automobile engine and transmission assembly, for enclosing the assembly for storage when it has been removed from an automobile. No means is apparent for capturing fluids expelled by the engine when it is running or being turned over, as provided by the present invention.

British Patent Publication No. 574,986 accepted on Jan. 29, 1946, titled "Improved Cover for Use In Protecting Marine And Other Internal Combustion Engines Against Water, Dampness Or Oil," describes a cover of flexible, waterproof material which is used to enclose an installed internal combustion engine in a boat or the like, to preclude its inadvertent submersion. While sealable passages are provided for engine inlet and exhaust so the engine may be operated with the cover in place, no means is provided to capture fluids passing through the engine, and/or fluids collecting within a housing beneath the engine, for disposal, as provided by the present invention.

British Patent Publication No. 1,208,806 published on Oct. 14, 1970, titled "Engine Cowling Ventral Door, For V/STOL Aircraft," describes an automatic mechanism or linkage for opening or lowering a ventral cover when the turbojet nozzle is adjusted downwardly to provide vertical thrust in a V/STOL turbojet aircraft. The device is permanently installed on the aircraft, and does not serve to capture fluids during a cleaning operation, nor is the device operable for routing fluids or engine exhaust during an engine cleaning operation, as provided by the present invention.

Finally, the present inventor is aware of a system previously developed for use in collecting wash liquids used in the cleaning of engines on C-130 military aircraft. The device utilizes a rigid collector of aluminum sheet (as opposed to the present flexible collector) beneath the forward portion of the engine nacelle, and routes air from the engine exhaust into a defueling tank to collect liquids passing through the engine and from the collector. The device is relatively complex in comparison to the present invention, with two 55 gallon drums welded together for attaching the engine exhaust duct to the defueling tank. The lid of the defueling tank is left open to vent the apparatus, with no filter being disclosed, as provided in the present invention. As such defueling tanks do not have horizontal baffles therein, they cannot separate the liquid from the engine exhaust air as efficiently as the present baffled container. Also, excess wash liquid typically overflows the engine intake during cleaning operations. The prior art device would allow this liquid to spill, whereas the present invention captures all liquids used in the cleaning operation and/or emanating from the engine and/or engine housing, by means of an intake extension on the collector. The prior art apparatus requires a powered tractor or the like to tow the defueling trailer to a location for storage, and the defueling tank and trailer are sufficiently large and heavy that they cannot be moved manually by a single individual, as can the present wash recovery system.

None of the above inventions and patents, either singly or in combination, is seen to describe the instant invention as claimed.

SUMMARY OF THE INVENTION

The present invention comprises an engine wash recovery system, for recovering liquids, contaminants, hazardous waste, etc. which is used or which is collected during the washing of an aircraft turbine engine. The system includes a relatively light weight, flexible shroud or collector which is removably suspended beneath the engine housing (nacelle, cowling, fuselage, etc.), for capturing liquids which run from the engine and collect within the housing, or which run along the outside of the housing. The present system also includes a duct which secures to the engine exhaust, for collecting fluids and spray which pass through the engine as it is turned over during the cleaning operation to flush deposits from the hot section thereof.

The nacelle collector and exhaust duct are connected to a container which accepts the fluids from the exterior and interior of the engine. The container is vented to ambient atmosphere to allow air passing from the engine exhaust to exit the system. Preferably, a filter is provided with the container, to capture liquid spray and particulates. The entire apparatus is relatively light in weight, portable, and relatively compact for ease of storage and transport as required. The apparatus or system is particularly well adapted for use during cleaning operations for multiengine turboprop aircraft engines, with the collector being easily temporarily affixed beneath the nacelle of such an engine. However, the device is easily configured for use with any turboprop or turbojet aircraft having their engine(s) housed in the fuselage.

Accordingly, it is a principal object of the invention to provide an improved engine wash recovery system for use in washing aircraft turbine engines, comprising a lightweight, flexible, and foldable collector for removably installing beneath an aircraft engine housing, a duct extending from the engine exhaust, and a container for accepting liquids and contaminants exiting the engine exhaust and engine housing during engine cleaning operations.

It is another object of the invention to provide an improved engine wash recovery system which includes filter means at the container, for separating liquid spray from air passing through the container, and which container includes baffle means therein, for reducing turbulence in the liquid being collected within the container.

It is a further object of the invention to provide an improved engine wash recovery system including a supplemental forward collector extension, for collecting liquid runoff from the engine intake.

An additional object of the invention is to provide an improved engine wash recovery system which may be adapted for use on single or multiengine turboprop or turbojet powered aircraft.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises an engine wash recovery system, for recovering wash water, detergents, solvents, hazardous materials, etc., used or expelled during the internal washing of an aircraft turbine engine. This procedure is conducted periodically with turbojet engines, to remove deposits of foreign matter in the hot section of the engines, particularly carbon buildup on the exhaust turbine blades. A wash liquid is passed into the intake or inlet of the engine cowling or nacelle, and the engine is turned over or rotated at a relatively low rpm, e.g., around 20% of maximum rated rpm. This forces the wash liquid through the engine due to the action of the compressor section, whereupon the wash liquid impacts the walls and turbine blades of the hot section and removes carbon and other foreign matter buildup therefrom.

Figure 1:
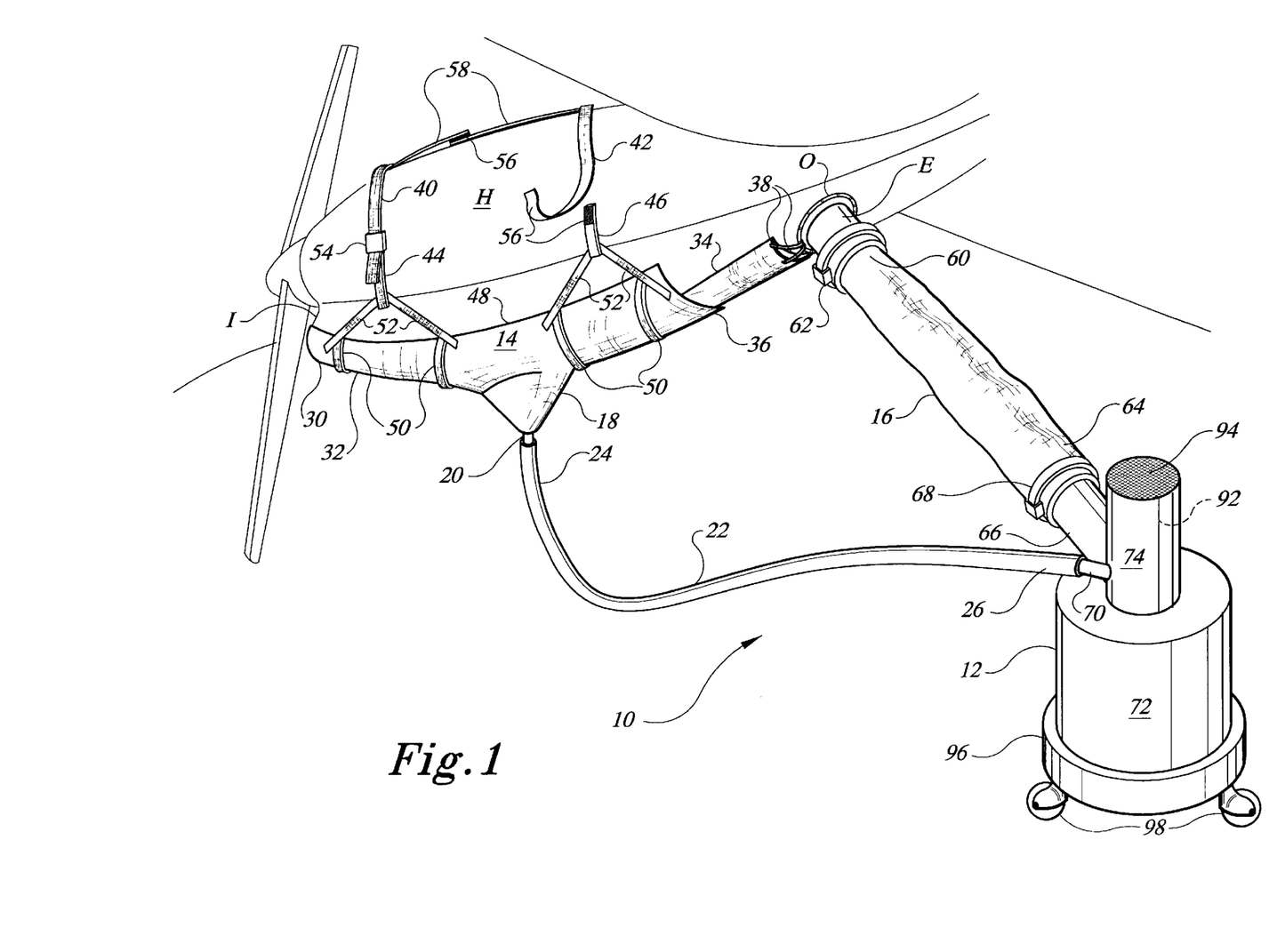
FIG. 1 is an environmental perspective view of the present engine wash recovery system, temporarily installed on a turboprop aircraft engine nacelle for recovering wash liquids and contaminants washed from the engine.

FIG. 1 illustrates the present engine wash recovery system invention in use on an engine of a multiengine turboprop aircraft, with the present system being designated by the reference numeral 10. The present system 10 comprises three basic components: A container 12 for containing expended liquids, foreign matter, hazardous materials, etc., washed from the engine; a collector 14, removably secured beneath the engine housing H (cowling, nacelle, or even the fuselage of a single engine aircraft) for collecting internal and external runoff from the housing H; and an exhaust duct 16, for collecting liquid spray passing from the engine exhaust E as it leaves the engine.

Figure 2:
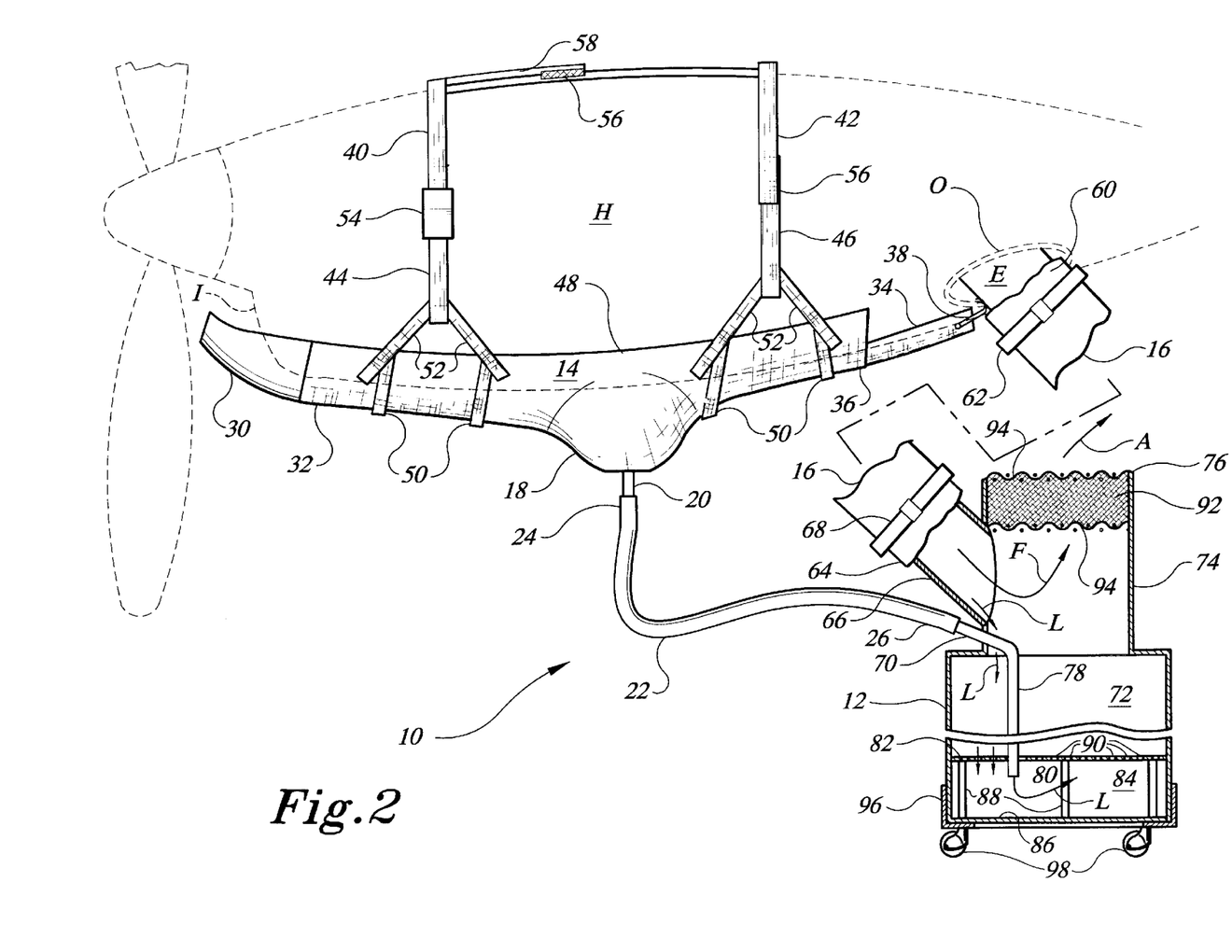
FIG. 2 is a left side elevation view in partial section of the engine wash recovery system installation.

The collector 14 is preferably formed of a flexible, foldable sheet of liquid impervious material (e.g., a plastic coated durable natural or synthetic fabric, etc.), for ease of compact storage when not in use. The collector 14 is formed to fit closely about the lower portion of the engine cowling or housing H when it is removably secured in place, as shown clearly in FIGS. 1 and 2. The collector 14 has a low point 18 situated in the general center thereof, with liquid runoff from the engine cowling or nacelle H naturally gravitating toward the low point 18 when the collector 14 is installed as indicated in FIGS. 1 and 2. The low point 18 includes a drain 20 depending therefrom, with a flexible collector drain tube or hose 22 having a first end 24 removably sealed to the drain 20 and an opposite second end 26 removably sealed to the container 12, as described in detail further below.

Figure 3:
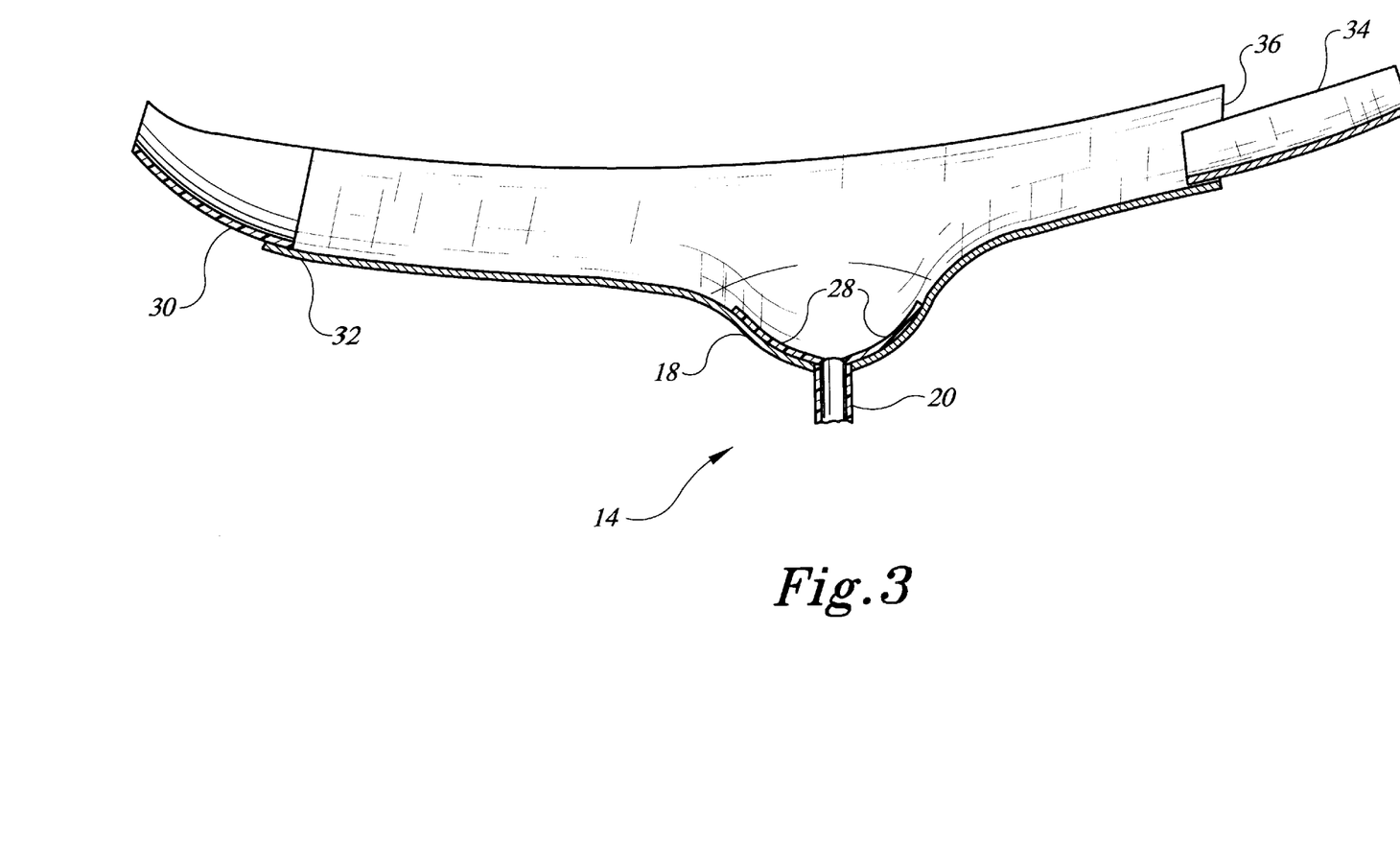
FIG. 3 is a left side elevation view in section of the engine housing collector portion of the present recovery system.

The low point or area 18 of the collector 14 preferably includes a relatively rigid drain support 28 surrounding the drain tube 20, as shown more clearly in the cross section view of the collector 14 shown in FIG. 3. This relatively rigid drain support 28 may be formed of a relatively stiff plastic or other suitable material, or even metal, if desired. The drain support 28 is permanently and immovably affixed in the low point 18 of the collector 14, in order to prevent the container 14 from folding or collapsing about the drain 20 and closing off the drain 20, in the event that a considerable amount of liquid runoff collects within the collector 14 before passing to the container 12, or if the drain tube 22 is shifted laterally, thereby placing a strain on the low point 18 which might otherwise cause it to fold or kink to a closed condition.

The collector 14 may include various additional features to provide greater utility and efficiency, as indicated in the drawings. For example, during engine wash operations, a wash liquid (detergent, solvent, etc.) is introduced into the intake or inlet I of the engine nacelle or housing H, and the engine is turned over at a low rpm relative to its normal operating rpm in order to draw the liquid through the engine, as described further above. Generally, the liquid is introduced into the intake I until some of the liquid spills from the intake I, thus indicating that the intake I of the engine is full.

Accordingly, the collector 14 may include a rigid extension 30 cantilevered forwardly from the collector forward portion or end 32 and extending forwardly beneath the engine inlet I when the collector 14 is installed about the aircraft engine housing H, as shown in FIGS. 1 and 2. Any liquid runoff or overflow from the engine inlet I, will run down the outside of the cowling or housing H to collect at the low point 18 of the collector 14, or will immediately drip from the front of the inlet I to be captured by the collector extension 30 therebeneath, thus precluding any spillage of any wash liquid runoff from the collector 14.

A second collector extension 34 extends rearwardly from the rear portion or edge 36 of the collector 14, serving to collect any runoff which escapes from the exhaust opening O or seams of the lower rear portion of the cowling or housing H. This rearward collector extension 34 may be formed of a relatively light weight, flexible piece of material (rubberized fabric, etc.), similar or identical to the material from which the main body of the collector 14 is made. One or more attachments 38 (bungees with hooks, or other suitable means) extend rearwardly from the rear extension 34, to draw the rear extension 34 back to the engine housing exhaust stack opening O, where the attachment 38 hooks may be secured. As the rear collector extension 34 is drawn taut by means of its forward attachment to the collector 14 and its removable opposite rear attachment to the engine exhaust stack opening O in the engine cowling H, there is no need to form it from a stiff and inflexible piece of material, as in the forward extension 30.

The collector portion 14 of the present engine wash recovery system 10, is secured immediately beneath the lower portion or bottom of the engine cowling or nacelle H by a series of straps extending over and around the cowling H, generally as shown in FIGS. 1 and 2. Preferably, at least a forward and a rearward strap, respectively 40 and 42, spaced apart from one another and extending from the first side or edge of the collector 14 (not shown, but it will be understood that the collector 14 is generally symmetrical), and mating forward and rearward straps 44 and 46 extending from the opposite second side 48 of the collector 14. (preferably, one set of the straps, e.g., straps 40 and 42, are considerably longer than the opposite mating straps, in order that the connections between the mating straps may be made along the side of the cowling or housing H where access is easier, rather than on top of the housing H.) Additional supporting straps, e.g., bottom straps 50 and Y-attachment straps 52, may be provided as desired to position the collector 14 securely in place on the cowling or nacelle E, and to maintain the proper shape for the collector 14 as it is weighted with liquid runoff.

Preferably, the straps 40, 42 and their opposite mating members 44, 46 are equipped with some form of adjustable fastening means, allowing the girth of the straps to be adjusted to fit different engine housing configurations. For example, the forwardmost straps 40, 44 of FIGS. 1 and 2 are equipped with a buckle 54, while the rearward straps 42, 46 are equipped with mating hook and loop fastening means 56 (e.g., Velcro, tm).

In some instances, the forwardmost strap 40 may tend to work forwardly along the engine housing H as the engine is turned over, due to vibration or other forces. Accordingly, a generally longitudinal retaining strap 58 may be provided, extending from forward strap 40 to rear strap 42. Preferably, the longitudinal retaining strap 58 is formed in a forward and a rear section, which may be adjustably joined together by mating hook and loop fastening material 56 or other means as desired. (It will be understood that any one unit of the present collector 14 would preferably utilize consistent and common strap fastening means throughout, and that the different fastening means 54 and 56 shown in FIGS. 1 and 2 are exemplary. Different fastening means than the buckle 54 and hook and loop fastening material 56 disclosed herein, may be used as desired.) Preferably, the forward and rearward components of the retaining strap 58 are secured to the longer first side straps 40 and 42 so as to lie generally along the upper centerline of the engine housing H, as depicted in FIGS. 1 and 2, in order to be generally evenly spaced from each edge of the collector 14.

In addition to the collector 14 described in detail above, the present system 10 includes a flexible exhaust duct 16, for collecting liquids exiting from the exhaust E of the engine when the engine is turned over. The duct 16 is preferably formed of a length of flexible hose, duct, or the like, e.g., having a spiral wire wound internal core to allow the duct to be collapsed for storage as desired, covered by a liquid impervious flexible material, as is known in the art of flexible ducts and the like. The duct 16 includes a first or inlet end 60, removably sealed to the engine exhaust outlet E by a suitable attachment 62, e.g., a worm gear hose clamp, or other suitable releasably installable securing means. The opposite second or outlet end 64 of the duct 16 is removably sealed to the engine exhaust duct inlet 66 of the container 12 by a similar second attachment means 68. When the engine is turned over to flush cleaning agents through the internal components thereof, liquids and air exiting from the engine exhaust E travel down the flexible engine exhaust duct 16, to enter the container 12 through the engine exhaust duct inlet 66 of the container 12. Air passing through the system is expelled from the container 12, as explained further below, while all liquids and contaminants are retained within the container 12.

The container 12 also accepts liquids from the engine housing collector 14 via the collector tube 22, which has its second end 26 removably sealed to the container 12 at an engine housing drain inlet 70 on the container 12. The container 12 is constructed to hold a sufficient quantity of liquid which would normally be used in the internal washing or cleaning of a turbine engine. It has been found that a 55 gallon drum provides sufficient volume, but such a drum cannot function to collect the liquids efficiently. Accordingly, the present container 12 includes various features which provide for the efficient recovery and storage of all of the liquids used in the internal cleaning or washing of a turbine engine, including contaminants, hazardous wastes, etc., washed from the engine.

The container 12 includes a main body or holding tank portion 72, with an upper portion 74 including the engine exhaust duct inlet 66 and engine housing drain inlet 70. However, it will be noted in the cross sectional view of FIG. 2, that the two liquid inlets 66 and 70, are separated from one another both externally and internally within the container 12, for reasons explained below.

It will be appreciated that even though the engine is being turned over or rotated at a relatively low rpm during the internal washing operation, with the engine fuel supply and ignition being shut off during the wash operation to preclude combustion and engine operation, there will still be a considerable volume of air passing through the engine and out of the engine exhaust, to the container 12. The amount of air entering the interior of the container 12, will be seen to produce a significant amount of turbulence therein, which could stir up and entrain liquids already retained therein, and blow them from the container 12 through the exhaust air outlet 76 of the container 12. Accordingly, liquids entering the container 12 from the engine housing or nacelle collector 14, pass downwardly directly to the bottom portion of the lower or holding tank portion 72 of the collector 12, by means of a rigid, internal tube or pipe 78, which is completely separate from the engine exhaust air inlet 66 of the container 12. The bottom or outlet end 80 of the engine housing or collector drain tube 78 within the container 12 is situated relatively closely to the bottom of the container 12, passing through a baffle 82 therein.

The baffle 82 is generally horizontally disposed in the lowermost internal portion 84 of the container 12, and is supported a short distance above the bottom or floor 86 of the container 12 by a plurality of baffle legs or supports 88. The baffle 82 includes a plurality of small passages 90 therethrough, to allow the limited passage of air or gases entrained in the flow from the collector 12 to pass therethrough, and/or to allow air captured below the baffle 82 to escape as the volume below the baffle 12 is taken up by expended wash liquids. Preferably, sufficient volume (several gallons) is provided below the level of the baffle 82 to accommodate all liquids passing through the engine during the engine internal wash operation, with the volume above the baffle 82 serving as an air and liquid separator for air and liquids entering the upper portion 74 of the container 12 from the engine exhaust.

Most of the liquids arriving at the container 12 will either flow through the internal tube or pipe 78 from the collector 14 and collector tube 22, or will collect in the bottom of the engine exhaust duct 16 to run directly downwardly into the container 12 and through the passages 90 of the baffle 82, as indicated by the arrows L representing liquid flow in the cross sectional view of the container 12 in FIG. 2. However, some of the liquid will be entrained in droplet or mist form in the relatively high volume of air passing into the upper portion 74 of the container 12 from the engine exhaust duct 16, as indicated by the flow arrow F in the container 12 in FIG. 2.

Accordingly, a filter 92 is removably installed within the top of the upper portion 74 of the container 12. The filter 92 may be secured in place by one or more screens 94, or other suitable filter retaining means. The filter is formed of a material having a porosity which allows the passage of gases (air, etc.) therethrough, but which is sufficiently dense to capture small liquid droplets or mist therein. Such droplets of liquid will collect in the filter 92 medium, eventually condensing and growing to a sufficient size to gravitate downwardly to the holding tank area 72 of the container 12, where they contact the baffle 82 and flow through the baffle passages 90 to the lowermost portion 84 of the container 12. Relatively clean air, freed of liquid mist and droplets therein, passes through the filter 92 and outwardly into the ambient atmosphere, as indicated by the air arrow A in FIG. 2.

In summary, the present engine wash recovery system provides a very easy to use, highly portable means of collecting and containing all wash liquids, solvents, hazardous materials, etc., which may be flushed from an aircraft turbine engine during internal washing or cleaning operations thereof. The flexible, foldable collector is quickly and easily securable to the underside of the engine housing, nacelle, cowling, or fuselage, where it serves to collect all liquid runoff from the engine housing. Forward and rearward extensions provide insurance that liquid overflow from the engine intake and/or exhaust opening of the housing, will also be captured by the collector.

Liquids passing through the engine during the wash operation as the engine is rotated or turned over to flush internal deposits therefrom, pass from the engine exhaust and into an exhaust duct, which contains exhaust air and any liquids entrained therein. The exhaust duct, like the collector, is formed of a flexible material, which may be easily collapsed for compact storage when not in use. Liquids from both the collector and the exhaust duct are conveyed to a container, which recovers all liquids which have passed through the engine or which have been expelled from the engine housing.

The container includes an upper portion, which receives liquids from the collector by means of a tube, and liquids and gases from the exhaust duct. Liquids from the collector are expelled into the container below a baffle therein, with liquids and air from the exhaust being expelled into the container in the upper portion thereof, with liquids from the exhaust dropping downwardly to pass through the porous baffle to be collected in the bottom of the container. A filter in the top of the container retains any further liquid droplets, to separate them from the air exiting the container.

When the engine internal wash operation has been completed, the collector may be unstrapped from its position below the engine housing, the drain hose removed from the collector and container, and the collector and hose stored for future use. The exhaust duct is removed from the engine exhaust and from the container and collapsed for compact storage, for future use.

The liquid contents of the container, with any detergents, solvents, hazardous materials flushed from the engine, etc., may be easily disposed of in a proper manner, by means of the portability of the present container. The container may include a tray 96 to which a plurality of wheels, rollers, or casters 98 are affixed, enabling a single individual to move the container about the area easily, even when it contains some amount of expended liquid therein. In any event, the container is sufficiently small and light, having a weight when empty and a volume not much greater than a conventional 55 gallon drum, that a single individual may easily carry or move the container portion about as desired, for ease of transport to a storage location. Preferably, the upper portion of the container is removable for access to the baffle and other components therein, for cleaning and removal of any sediment which may build up from time to time.

Accordingly, the present engine wash recovery system will be seen to provide a much needed, compact, lightweight, portable, economical, and easily stored means of collecting engine wash liquids during internal engine wash operations, thereby protecting the environment from any hazardous chemicals or materials washed from the engine, with its ease of setup and use promoting use of the system whenever an engine wash operation is scheduled, whether on a single or multiengine turboprop or turbojet aircraft.

It is to be understood that the present invention is not limited to the sole embodiment described above, but encompasses any and all embodiments within the scope of the following claims.

I claim:

1. An engine wash recovery system for recovering wash liquids and contaminants washed from an aircraft turbine engine and engine housing, with the housing having an inlet and an exhaust opening and the engine including an exhaust, said system comprising:

a container for recovering liquids collected from the aircraft engine and engine housing;

said container having an upper portion including an engine exhaust duct inlet and an engine housing drain inlet, with said exhaust duct inlet and said drain inlet being separated from one another;

said container further including an upper end having an engine exhaust air outlet therein;

a collector comprising a foldable, flexible sheet of liquid impervious material, for removably and suspendably securing beneath the lower portion of the engine housing;

said collector including a low point and drain generally centrally disposed therein, for collecting liquid runoff from the engine housing when said collector is unfolded and secured beneath the engine housing;

a flexible collector drain tube having a first end removably and sealingly connected to said drain of said collector, and an opposite second end removably and sealingly connected to said engine housing drain inlet of said container; and an exhaust duct comprising a flexible, collapsible length of material having an inlet end for removably and sealingly connecting to the exhaust of the turbine engine, and an opposite outlet end for removably and sealingly connecting to said exhaust duct inlet of said container; whereby said container captures and recovers wash liquids and contaminants washed from the engine and engine housing during washing operations thereof, with liquids flowing to the exterior of the engine housing being collected within said collector disposed immediately below the engine housing and transferred to said container by said collector drain tube, and with liquids and air passing through the engine as the engine is turned over during wash operations, being transferred to said container by said exhaust duct and with air exiting said container through said engine exhaust air outlet thereof.

2. The engine wash recovery system according to claim 1, wherein:
said container has a lowermost internal portion including a generally horizontally disposed baffle extending thereacross; and
said engine housing drain inlet of said container comprises a rigid tube extending from said upper portion of said container, internally through said container and through said baffle therein to an outlet point within said container and below said baffle.

3. The engine wash recovery system according to claim 1, including filter means disposed within said engine exhaust air outlet of said container, for precluding dispersal of liquid spray and contaminants from said container.

4. The engine wash recovery system according to claim 1, including a plurality of wheels disposed beneath said container.

5. The engine wash recovery system according to claim 1, including a rigid drain support disposed about said drain of said collector, for precluding collapse of said drain.

6. The engine wash recovery system according to claim 1, wherein said collector includes a rigid, cantilevered forward extension, for extending beneath the engine housing inlet and for capturing liquid runoff therefrom during engine washing operations.

7. The engine wash recovery system according to claim 1, wherein said collector includes a rearward portion with a rearward extension extending therefrom for capturing liquid runoff from the exhaust opening area of the engine housing during washing operations, with said rearward extension including means for removably attaching to the exhaust opening of the engine housing.

8. The engine wash recovery system according to claim 1, wherein said collector has a first edge and an opposite second edge, with each said edge including at least a forward and a rearward strap extending therefrom and spaced apart from one another, and with each said strap from said first edge being adjustably attachable to a corresponding said strap from said second edge for securing over and about the engine housing, for securing said collector immediately beneath said engine housing.

9. The engine wash recovery system according to claim 8, wherein each said strap from said first edge and each said strap from said second edge of said collector have corresponding mating ends including adjustable attachment means thereon, with said adjustable attachment means being selected from the group consisting of buckles and hook and loop fastening material.

10. The engine wash recovery system according to claim 8, wherein each said strap includes a generally longitudinal retaining strap adjustably securable therebetween, for precluding forward movement of at least said forward strap forwardly along the engine housing.

11. An engine wash recovery system for recovering wash liquids and contaminants washed from an aircraft turbine engine and engine housing, with the housing having an inlet and an exhaust opening and the engine including an exhaust, said system comprising:
a container for recovering liquids collected from the aircraft engine and engine housing;
said container having an upper portion including an engine exhaust duct inlet and an engine housing drain inlet, with said exhaust duct inlet and said drain inlet being separated from one another;
said container further including an upper end having an engine exhaust air outlet therein, with said exhaust air outlet including filter means disposed therein for precluding dispersal of liquid spray and contaminants from said container;
a collector comprising a sheet of liquid impervious material, for removably and suspendably securing beneath the lower portion of the engine housing;
said collector including a low point and drain generally centrally disposed therein, for collecting liquid runoff from the engine housing when said collector is unfolded and secured beneath the engine housing;
a flexible collector drain tube having a first end removably and sealingly connected to said drain of said collector, and an opposite second end removably and sealingly connected to said engine housing drain inlet of said container; and
an exhaust duct comprising a flexible, collapsible length of material having an inlet end for removably and sealingly connecting to the exhaust of the turbine engine, and an opposite outlet end for removably and sealingly connecting to said exhaust duct inlet of said container; whereby
said container captures and recovers wash liquids and contaminants washed from the engine and engine housing during washing operations thereof, with liquids flowing to the exterior of the engine housing being collected within said collector disposed immediately below the engine housing and transferred to said container by said collector drain tube, and with liquids and air passing through the engine as the engine is turned over during wash operations, being transferred to said container by said exhaust duct and with air exiting said container through said engine exhaust air outlet thereof.

12. The engine wash recovery system according to claim 11, wherein:
said container has a lowermost internal portion including a generally horizontally disposed baffle extending thereacross; and
said engine housing drain inlet of said container comprises a rigid tube extending from said upper portion of said container, internally through said container and through said baffle therein to an outlet point within said container and below said baffle.

13. The engine wash recovery system according to claim 11, wherein said collector is foldable and flexible.

14. The engine wash recovery system according to claim 11, including a plurality of wheels disposed beneath said container.

15. The engine wash recovery system according to claim 11, including a rigid drain support disposed about said drain of said collector, for precluding collapse of said drain.

16. The engine wash recovery system according to claim 11, wherein said collector includes a rigid, cantilevered forward extension, for extending beneath the engine housing inlet and for capturing liquid runoff therefrom during engine washing operations.

17. The engine wash recovery system according to claim 11, wherein said collector includes a rearward portion with a rearward extension extending therefrom for capturing liquid runoff from the exhaust opening area of the engine housing during washing operations, with said rearward extension including means for removably attaching to the exhaust opening of the engine housing.

18. The engine wash recovery system according to claim 11, wherein said collector has a first edge and an opposite second edge, with each said edge including at least a forward and a rearward strap extending therefrom and spaced apart from one another, and with each said strap from said first edge being adjustably attachable to a corresponding said strap from said second edge for securing over and about the engine housing, for securing said collector immediately beneath said engine housing.

19. The engine wash recovery system according to claim 18, wherein each said strap from said first edge and each said strap from said second edge of said collector have corresponding mating ends including adjustable attachment means thereon, with said adjustable attachment means being selected from the group consisting of buckles and hook and loop fastening material.

20. The engine wash recovery system according to claim 18, wherein each said strap includes a generally longitudinal retaining strap adjustably securable therebetween, for precluding forward movement of at least said forward strap forwardly along the engine housing.

* * * * *